United States Patent [19]

Houlihan et al.

[11] 3,879,418

[45] Apr. 22, 1975

[54] 1,1-DISUBSTITUTED-2-ALKYL 3-OXO-ISOINDOLINES

[75] Inventors: William J. Houlihan, Mountain Lakes; Jeffrey Nadelson, Parsippany, both of N.J.

[73] Assignee: Sandoz-Wander, Inc., Hanover, N.J.

[22] Filed: Mar. 12, 1973

[21] Appl. No.: 340,239

Related U.S. Application Data

[62] Division of Ser. No. 74,467, Sept. 22, 1970, Pat. No. 3,741,980.

[52] U.S. Cl....260/325 PH; 260/326.1; 260/346.2 R; 260/559 R; 424/274

[51] Int. Cl............................................. C07d 27/50

[58] Field of Search.................................... 260/325

[56] References Cited
OTHER PUBLICATIONS

Collington et al. J. Chem. Soc., (c), 1968, 1021–1025.

*Primary Examiner*—Joseph A. Narcavage
*Attorney, Agent, or Firm*—Gerald D. Sharkin; Robert S. Honor

[57] ABSTRACT 1,1-disubstituted-2-alkyl isoindolines, e.g. 1,1-diphenyl-2-methyl isoindoline, are prepared by treating a corresponding isoindolinone with mild reducing agent. The compounds are useful as analgesics.

3 Claims, No Drawings

1,1-DISUBSTITUTED-2-ALKYL 3-OXO-ISOINDOLINES

This is a division of application Ser. No. 74,467 filed Sept. 22, 1970 now U.S. Pat. No. 3,741,980.

This invention relates to isoindolines. More particularly, it relates to 1-phenyl or substituted phenyl-1-aryl-2-alkyl isoindolines, acid addition salts and intermediates thereof, and processes for the preparation of these materials.

The compounds of this invention may be represented by the following structural formula:

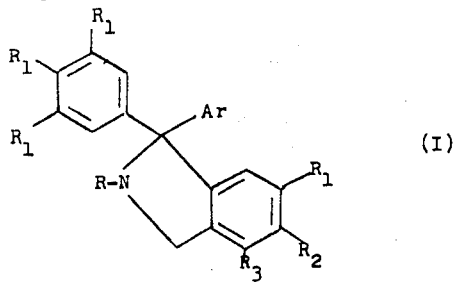

wherein
R represents primary and secondary loweralkyl, i.e. primary and secondary alkyl having 1–5 carbon atoms such as methyl, ethyl, and isopropyl;

each $R_1$, independently, represents hydrogen, halo having an atomic weight of 19 to 36, trifluoromethyl, loweralkoxy, i.e. alkoxy having 1 to 5 carbon atoms, e.g. methoxy, ethoxy, propoxy, isopropoxy, butoxy, isobutoxy and the like or loweralkyl, i.e. alkyl having 1–5 carbon atoms such as methyl, ethyl, propyl, isopropyl and the like; or two of $R_1$ together represent methylenedioxy, provided they are on adjacent carbon atoms, $R_2$ represents hydrogen, trifluoromethyl, lower alkyl, as previously defined, or lower alkoxy as previously defined;

$R_3$ represents hydrogen, halo having an atomic weight of 19 to 36, or lower alkoxy as previously defined; and Ar represents phenyl, pyridyl (2,3 and 4), thienyl (2 and 3), and furyl (2 and 3) and naphthyl (1 and 2); provided no two trifluoromethyl groups are on adjacent carbon atoms, provided also that no more than three of $R_1$, $R_2$ and $R_3$ are other than hydrogen and that no more than two of $R_1$, $R_2$ and $R_3$ are other than hydrogen in one ring.

The compounds of formula (I) may be prepared as represented by the following reaction scheme:

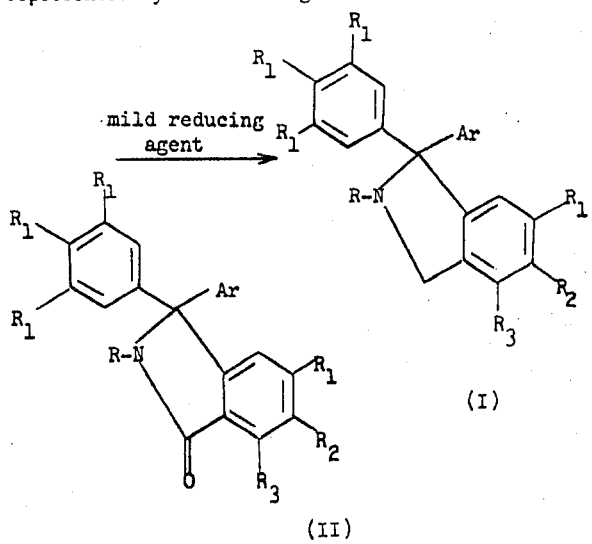

wherein
R, $R_1$, $R_2$, $R_3$, and Ar and the provisos have the above-stated significance.

According to this aspect of the invention, the compounds of formula (I) are prepared by reducing a compound of formula (II) with a mild reducing agent, particularly metal hydride, e.g. lithium aluminum hydride, diisobutylaluminum hydride, diborane, or sodium bis-(2-methoxyethoxy) aluminum hydride, in inert solvent and insert atmosphere, e.g. nitrogen gas, at a temperature of from about −10°C. to 150°C., conveniently at the reflux temperature of the system, for about 15 to 48 hours, preferably about 18 to 24 hours. Solvents which may be used include ethers such as ethyl ether or tetrahydrofuran, or hydrocarbon solvents such as benzene, toluene and the like. The temperature, reaction times and solvents used are not critical. The compounds of formula (I) may be recovered using conventional recovery techniques such as crystallization.

The compounds of formula (II), a further aspect of this invention, may be prepared according to the following reaction scheme:

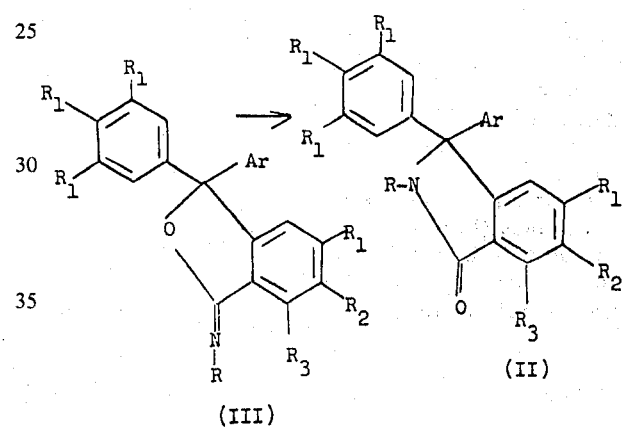

wherein
R, $R_1$, $R_2$, $R_3$, Ar and the provisos have the above-stated significance.

Compounds (II) are prepared by treating compounds (III) with strong mineral acid such as hydrohalic acid, e.g. hydrochloric acid, at about 40°–100°C, conveniently at the reflux temperature of the system, for about 12–24 hours. Neither the reaction time nor temperature are critical, and solvent is not required. The compounds (II) are then recovered using conventional techniques, e.g., filtration and recrystallization.

The compounds (III) are prepared according to the following reaction scheme:

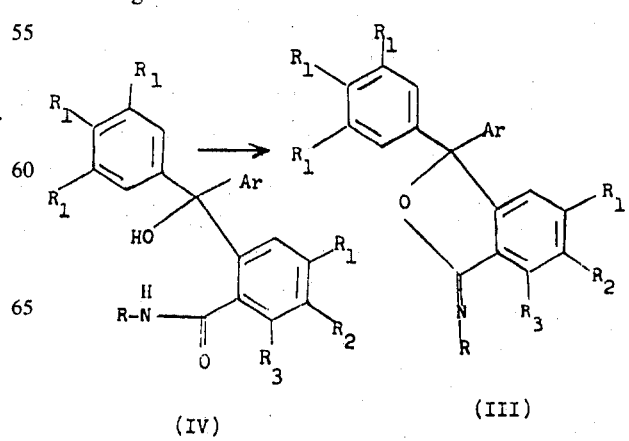

The compounds of formula (III) are prepared by cyclizing a compound of formula (IV) in an aqueous or non-aqueous media with mineral acid, such as sulfuric acid, a hydrohalic acid such as hydrochloric or hydrobromic acid, phosphoric acid and the like, at a temperature of from about 70° to 120°C., conveniently at the reflux temperature of the system. More preferably, and for generally improved yields, the compounds (III) may be prepared from compounds of formula (IV) by treatment with organic acids or their anhydrides, such as acetic acid, trifluoroacetic acid, acetic acid anhydride, trifluoroacetic acid anhydride and the like, at a temperature of about −10° to +10°C., preferably −5° to +5°C. The anhydrides are preferred and trifluoroacetic acid anhydride is a particularly preferred cyclizing agent.

The reaction is suitably conducted for about 1–48 hours, preferably 24–48 hours for the mineral acids and 1–24 hours for the organic acids or their anhydrides. The presence of solvent is not necessary and generally is not desired since it could interfere with the obtaining of the compounds (III). To improve yields and obtain a better quality product, the reaction may be performed under inert atmosphere, e.g. nitrogen gas. Neither the time nor temperature of reaction is critical. Compounds (III) may be recovered using conventional recovery techniques, such as filtration.

The compounds (III) are novel except in that instance where Ar represents phenyl, R represents methyl and all other variable substituents represent hydrogen.

According to a still further aspect of this invention, compounds (IV), new and novel except where Ar is phenyl, R is methyl and all other substituents are hydrogen, may be prepared as illustrated in the following reaction scheme from compounds (V) and (VI).

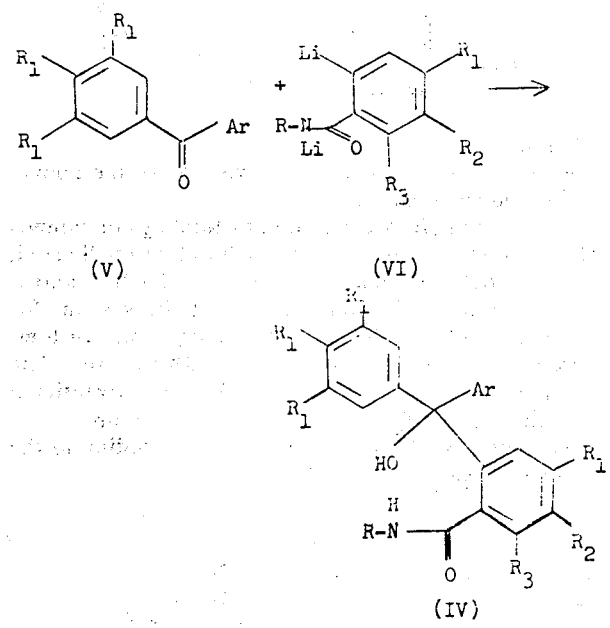

where
R, $R_1$, $R_2$, $R_3$, Ar and the provisos have the above stated significance.

Compounds (IV) may be prepared by condensing a compound (V) with a compound (VI) in an inert solvent such as ether, e.g. diethyl ether or tetrahydrofuran, or hydrocarbons or aromatic hydrocarbons such as hexane, heptane, benzene, toluene and the like. This condensation may be carried out at a temperature of from about −10° to +10°C, preferably −5° to +5°C for about 1 to 3 hours. The exact time and temperature of reaction and the particular solvent used is not critical. The resulting reaction product is then hydrolyzed, preferably by adding the reaction mixture to water or ice or aqueous solutions normally used for hydrolysis, e.g., ammonium chloride solution, at about 0° to 10°C. The product may then be used directly for the preparation of compounds (III).

It will be understood that certain of the compounds of formulas (I), (II), (III) and (V) exist in racemic form or in the form of optically active isomers. The separation of the respective isomers may be accomplished employing conventional techniques and such isomers are included within the scope of the invention.

Certain of the compounds of formulas (V) and (VI) are known and may be prepared by methods described in the literature. Those compounds of formulas (V) and (VI) not specifically described may be prepared by analogous methods from known materials.

The compounds of formula (I) are useful because they possess pharmacological activity in animals, such as mamals. In particular, the compounds possess analgesic activity as indicated by their activity in mice at 25 mg/kg orally when tested using the "Hot-Plate" method of Woolfe and McDonald (J. Pharmacol. & Exper. Therap. 80:300, 1944).

When so utilized, the compounds may be combined with one or more pharmaceutically acceptable carriers or adjuvants. Depending upon the particular active compound employed, the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

In general, satisfactory results are obtained when the compounds are administered orally at a daily dosage of from about 0.1 – 100 mg/kg of animal body weight, preferably given in divided doses, 2 to 4 times a day or in sustained release form. For most larger mammals (e.g., primates) the total daily dosage is from about 5 milligrams to about 400 milligrams. Dosage forms suitable for internal use comprise from about 1.5 milligrams to about 200 milligrams of the active compound in intimate admixture with a solid or liquid pharmaceutically acceptable carrier or diluent.

A representative formulation suitable for oral administration is a capsule prepared by standard techniques which contains the following

| Ingredients: | Parts by weight: |
| --- | --- |
| 1,1-diphenyl-2-methyl isoindoline | 25 |
| Inert filler (starch, kaolin, lactose, etc.) | 275 |

As noted above, the compounds of formula (I) exist as optical isomers. In some cases greater pharmacological activity or other beneficial attribute may be found for a particular isomer and in such instances administration of such isomer may be preferred.

The preferred compounds of formula (I) are those wherein Ar, R and $R_1$ on the isoindoline moiety are as previously defined and all other substituents represent hydrogen.

The corresponding compounds of formulae (II), (III) and (VI) are similarly preferred.

EXAMPLE 1

α,α-Diphenyl-α-hydroxy-N-methyl-o-toluamide

To a flask equipped with a stirrer, dropping funnel, condenser and gas inlet tube maintained under a nitrogen atmosphere there is added at room temperature 15.2 g. (o.018 mole) of N-methyl benzamide and 150 ml. of dry tetrahydrofuran. The reaction flask is immersed in an ice bath and cooled to an internal temperature of 5°C. Stirring is initiated and 152 ml. of 1.6 M n-butyllithium (0.24 mole) in hexane is added dropwise in ca 1 hour maintaining the temperature below 8°C. The resulting dilithio salt is stirred at 5°C. for an additional hour and then a solution of 19.6 g (0.108 mole) of benzophenone in 75 ml. of anhydrous tetrahydrofuran is added dropwise in ca 45 min. maintaining the temperature between −10° and 10°C. The resulting mixture is stirred at 5°C. for 1 hour longer and then poured with stirring onto 300 g. of ice while maintaining the temperature below 10°C. The layers are separated, the tetrahydrofuran layer fried over anhydrous magnesium sulfate, and filtered and evaporated in vacuo. The resulting oil is triturated with cold ethyl ether and filtered to give crude α,α-diphenyl-α-hydroxy-N-methyl-o-toluamide.

When the above process is carried out and
a. m-methyl benzophenone,
b. phenyl-2-pyridylketone,
c. p-methoxyphenyl-2-thienylketone,
d. p-chlorophenyl-3-furylketone,
e. 2-naphthyl p-trifluoromethylphenylketone, or
f. 3,4-methylenedioxy benzophenone
is used in place of benzophenone, there is obtained
a. α--hydroxy-α-phenyl-α-(m-tolyl))-N-methyl-o-toluamide,
b. α-hydroxy-α-phenyl-α-(2-pyridyl)-N-methyl-o-toluamide,
c. α-hydroxy-α-(p-methoxyphenyl)-α-(2-thienyl)-N-methyl-o-toluamide,
d. α-hydroxy-α-(p-chlorophenyl)-α-(3-furyl)-N-methyl-o-toluamide,
e. α-hydroxy-α-(2-naphthyl)-α-(p-trifluoromethylphenyl)-N-methyl-o-toluamide, or
f. α-hydroxy-α(3,4-methylenedioxyphenyl)-α-phenyl-N-methyl-o-toluamide, respectively.

When the above process is carried out and o-chloro-N-methyl benzamide or N-ethyl-m-methoxy benzamide is used in place of N-methyl benzamide, there is obtained 6-chloro-α,α-diphenyl-α-hydroxy-N-methyl-2-toluamide, or α,α-diphenyl-α-hydroxy-5-methoxy-N-ethyl-2-toluamide, respectively.

EXAMPLE 2

3,3-Diphenyl-1-methylimino phthalan

To a flask equipped with a stirrer, condenser and gas inlet tube maintained under a nitrogen atmosphere there is added at room temperature 100 g. of trifluoroacetic acid anhydride. The flask is cooled to an internal temperature of 0°C. and 20 g. of the crude α,α-diphenyl-α-hydroxy-N-methyl-o-toluamide obtained in Example 1 is added in portions with stirring. The reaction mixture is maintained at 0°C. for 1 hour, at room temperature for 18 hours, and is then evaporated in vacuo. The residue is dissolved in methylene chloride and washed with 100 ml. of water, 100 ml. of 2N sodium hydroxide and again 100 ml. of water, dried over magnesium sulfate, filtered and evaporated in vacuo. The resulting solid is triturated with cold ethyl ether and the ether insoluble material is recrystallized from hot ethyl acetate to give 3,3-diphenyl-1-methylimino phthalan.

When the above procedure is carried out and
a. α-hydroxy--α-phenyl-α(m-tolyl)-N-methyl-o-toluamide,
b. α-hydroxy-α-phenyl-α(2-pyridyl)-N-methyl-o-toluamide,
c. α-hydroxy-α-(p-methoxyphenyl(-α-(2-thienyl)-N-methyl-o-toluamide,
d. α-hydroxy--α-(p-chlorophenyl-α-(3-furyl)-N-methyl-o-toluamide,
e. α-hydroxy-α-(2-naphthyl)-α(p-trifluoromethylphenyl)-N-methyl-o-toluamide,
f. α-hydroxy-α(3,4-methylenedioxyphenyl)-α-phenyl-N
g. 6-chloro-α,α-diphenyl-α-hydroxy-N-methyl-2-toluamide, or
h. α,α-diphenyl-α-hydroxy-5-methoxy-N-ethyl-2-toluamide
is used in place of α,α-diphenyl-α-hydroxy-N-methyl-o-toluamide, there is obtained
a. 1-methylimino-3-phenyl-3-(m-tolyl)phthalan,
b. 1-methylimino-3-phenyl-3(2-pyridyl)phthalan,
d. 3-(p-chlorophenyl)-3-(3-furyl)-1-methylimino phthalan,
e. 1-methylimino-3-(2-naphtyl)-3-(p-trifluoromethylphenyl)phthalan,
f. 1-methylimino-3-(3,4-methylenedioxyphenyl)-3-phenyl phthalan,
g. 5-chloro-3,3-diphenyl-1-methyliminophthalan, or
h. 3,3-diphenyl-1-ethylimino-6-methoxy phthalan, respectively.

EXAMPLE 3

1,1-Diphenyl-2-methyl isoindoline-3-one

A mixture of 36.7 g. of 3,3-diphenyl-1-methylimino phthalan and 400 ml. of 2N hydrochloric acid is heated at reflux for 18 hours. The mixture is then cooled and filtered, and the resulting solid is washed with water, dissolved in methylene chloride and dried with magnesium sulfate. The solution is then filtered, evaporated and the resulting solid is recrystallized from hot ethyl acetate to give 1,1-diphenyl-2-methyl isoindoline-3-one.

When the above procedure is used and in place of 3,3-diphenyl-1-methylimino phthalan there is used
a. 1-methylimino-3-3-(m-tolyl)phthalan,
b. 1-methylimino-3-phenyl-3-(2-pyridyl)phthalan,
c. 3-(p-methoxyphenyl)-1-methylimino-3-(2-thienyl)phthalan,
d. 3-(p-chlorlphenyl)-3-(3-furyl)-1-methylimino phthalan,
e. 1-methylimino-3-(2-naphyl)-3-(p-trifluoromethylphenyl)phthalan,
f. 1-methylimino-3-(3,4-methylenedioxyphenyl)-3-phenyl phthalan, g. 5-chloro-3,3-diphenyl-1-methylimino phthalan, or
h. 3,3-diphenyl-1-ethylimino-6-methoxy phthalan,
there is obtained
a. 2-methyl-1-phenyl-1-(m-tolyl)isoindoline-3-one,
b. 2-methyl-1-phenyl-1(2-pyridyl)isoindoline-3-one,
c. 1-(p-methoxyphenyl)-2-methyl-1-(2-thienyl)isoindoline-3-one,
d. 1-(p-chlorophenyl)-1-(3-furyl)-2-methyl isoindoline-3-one,
e. 2-methyl-1-(2-naphthyl)-1-(p-trifluoromethylphenyl)isoindoline-3-one,
f. 2-methyl-1 1-(3,4-methylenedioxyphenyl)-1-phenyl isoindoline-3-one,
g. 6-chloro-1,1-diphenyl-2-methyl isoindoline-3-one, or
h. 1,1-diphenyl-2-ethyl-5-methoxy isoindoline-3-one, respectively.

EXAMPLE 4

1,1-Diphenyl-2-methyl isoindoline

To a flask equipped with a stirrer, condenser, and gas inlet tube maintained under a nitrogen atmosphere there is added at room temperature 1.14 g. (0.03 mole) of lithium aluminum hydride and 50 ml. of anhydrous tetrahydrofuran. Stirring is initiated and a solution of 6.3 g. (0.021 mole) of 1,1-diphenyl-2-methyl isoindoline-3-one in 120 ml. of anhydrous tetrahydrofuran is added dropwise in ca. 30 minutes. The resulting mixture is refluxed for 18 hours and cooled in an ice bath. Ethylacetate (6.8 ml) is added dropwise in ca. 10 minutes, followed by the dropwise addition of 2.3 ml. of 2N of sodium hydroxide in ca. 10 minutes and the dropwise addition of 3.4 ml. of water in ca. 10 minutes. The resulting mixture is dried over anhydrous magnesium sulfate, filtered and evaporated in vacuo to give a semisolid which is triturated with hot ether. The filtrate is evaporated in vacuo and the residue recrystallized from pet. ether to give 1,1-diphenyl-2-methyl isoindoline; m.p. 102°–104.5°C.

When the above process is carried out and in place of 1,1-diphenyl-2-methyl isoindoline-3-one there is used
a. 2-methyl-1-phenyl-1-(m-tolyl)isoindoline-3-one,
b. 2-methyl-1-phenyl-1-(2-pyridyl)isoindoline-3-one,
c. 1-(p-methoxyphenyl)-2-methyl-1-(2-thienyl)isoindoline-3-one,
d. 1-(p-chlorophenyl)-1-(3-furyl)-2-methyl isoindoline-3-one,
e. 2-methyl-1-(2-naphthyl)-1-(op-trifluoromethylphenyl)isoindoline-3-one,
f. 2-methyl-1(3,4-methylenedioxyphenyl)-1-phenyl isoindoline-3-one,
g. 6-chloro-1,1-diphenyl-2-methyl isoindoline-3-one, or
h. 1,1-diphenyl-2-ethyl-5-methoxy isoindoline-3-one,
there is obtained
a. 2-methyl-1-phenyl-1-(m-tolyl)isoindoline,
b. 2-methyl-1-phenyl-1-(2-pyridyl)isoindoline,
c. 1-(p-methoxyphenyl)-2-methyl-1-(2-thienyl)isoindoline,
d. 1 1-(p-chlorphenyl)-1-(3-furyl)-2-methyl isoindoline,
e. 2-methyl-1((2-naphthyl)-1(p-trifluoromethylphenyl)isoindoline,
f. 2-methyl-1-(3,4-methylenedioxyphenyl)-1-phenyl isoindoline,
g. 6-chloro-1,1-diphenyl-2-methyl isoindoline, or
h. 1,1-diphenyl-2-ethyl-5-methoxy isoindoline, respectively.

What is claimed is:
1. A compound of the formula

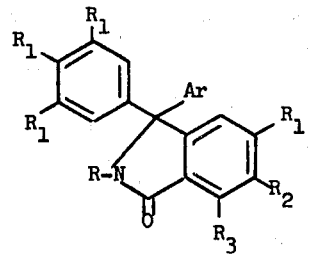

wherein
R represents primary and secondary lower alkyl,
each $R_1$ independently, represents hydrogen, halo having an atomic weight of 19 to 36, trifluoromethyl, lower alkoxy or lower alkyl;
or two of $R_1$ together represent methylenedioxy, provided they are on adjacent carbon atoms;
$R_2$ represents hydrogen, trifluoromethyl, loweralkoxy or lower alkyl;
$R_3$ represents hydrogen, halo having an atomic weight of 19–36, or lower alkoxy; and
Ar represents phenyl, pyridyl, thienyl, furyl or naphthyl; provided no two trifluoromethyl groups are on adjacent carbon atoms, provided also that no more than three of $R_1$, $R_2$ and $R_3$ are other than hydrogen, and that no more than two of $R_1$, $R_2$ and $R_3$ are other than hydrogen in one ring, or a pharmaceutically acceptacle acid addition salt thereof.

2. A compound according to claim 1 which is 1,1-diphenyl-2-methyl isoindoline-3-one.

3. A compound of the formula

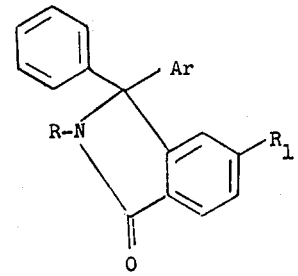

where
R, $R_1$ and Ar are as defined in claim 1.

* * * * *